US007135541B2

(12) United States Patent  
DeBruin et al.

(10) Patent No.: US 7,135,541 B2
(45) Date of Patent: Nov. 14, 2006

(54) POLYESTER PROCESS USING A PIPE REACTOR

(75) Inventors: Bruce Roger DeBruin, Kingsport, TN (US); Richard Gill Bonner, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 110 days.

(21) Appl. No.: 10/456,309

(22) Filed: Jun. 6, 2003

(65) Prior Publication Data

US 2004/0249111 A1    Dec. 9, 2004

(51) Int. Cl.
   C08G 63/00     (2006.01)
(52) U.S. Cl. ............... 528/272; 422/131; 422/135; 524/81; 526/64; 526/65; 526/67; 528/271
(58) Field of Classification Search ............. 422/131, 422/135; 528/271, 272; 524/81; 526/64, 526/65, 67
See application file for complete search history.

(56) References Cited

U.S. PATENT DOCUMENTS

| | | | |
|---|---|---|---|
| 2,361,717 A | 10/1944 | Taylor | |
| 2,709,642 A | 5/1955 | Mann, Jr. et al. | |
| 2,753,249 A | 7/1956 | Idenden et al. | |
| 2,829,153 A | 4/1958 | Vodonik | |
| 2,905,707 A | 9/1959 | Hurt et al. | |
| 2,973,341 A | 2/1961 | Hippe et al. | |
| 3,044,993 A | 7/1962 | Tiemersma | |
| 3,052,711 A | 9/1962 | Glogau et al. | |
| 3,054,776 A | 9/1962 | Higgins | |
| 3,110,547 A | 11/1963 | Emmert | |
| 3,113,843 A | 12/1963 | Li | |
| 3,161,710 A | 12/1964 | Turner | |
| 3,185,668 A | 5/1965 | Meyer et al. | |
| 3,192,184 A | 6/1965 | Brill et al. | |
| 3,241,926 A | 3/1966 | Parker et al. | |
| 3,254,965 A | 6/1966 | Ogle | |
| 3,376,353 A | 4/1968 | Tate | |
| 3,385,881 A | 5/1968 | Bachmann et al. | |
| 3,402,023 A | 9/1968 | Dobo | |
| 3,427,287 A | 2/1969 | Pengilly | |
| 3,442,868 A | 5/1969 | Ogata et al. | |
| 3,458,467 A | 7/1969 | Herrie et al. | |
| 3,468,849 A | 9/1969 | Rothert | |
| 3,480,587 A | 11/1969 | Porter | |
| 3,487,049 A | 12/1969 | Busot | |
| 3,496,146 A | 2/1970 | Mellichamp, Jr. | |
| 3,496,220 A | 2/1970 | McCarty et al. | |
| 3,497,743 A | 2/1970 | Kemkes | |
| 3,507,905 A | 4/1970 | Girantet et al. | |
| 3,522,214 A | 7/1970 | Crawford et al. | |
| 3,551,396 A | 12/1970 | Lanthier | |
| 3,582,244 A | 6/1971 | Sinclari et al. | |
| 3,590,070 A | 6/1971 | Martin et al. | |
| 3,590,072 A | 6/1971 | Leybourne, III | |
| 3,595,846 A | 7/1971 | Rouzier | |
| 3,600,137 A | 8/1971 | Girantet et al. | |
| 3,609,125 A | 9/1971 | Fujimoto et al. | |
| 3,639,448 A | 2/1972 | Matsuzawa et al. | |
| 3,644,096 A | 2/1972 | Lewis et al. | |
| 3,644,294 A | 2/1972 | Siclari et al. | |
| 3,644,483 A | 2/1972 | Griehl et al. | |
| 3,646,102 A | 2/1972 | Kobayashi et al. | |
| 3,647,758 A | 3/1972 | Ryffel et al. | |
| 3,651,125 A | 3/1972 | Lewis et al. | |
| 3,684,459 A | 8/1972 | Tate et al. | |
| 3,689,461 A | 9/1972 | Balint et al. | |
| 3,697,579 A | 10/1972 | Balint et al. | |
| 3,723,391 A | 3/1973 | Beer et al. | |
| 3,740,267 A | 6/1973 | Haylock et al. | |
| 3,781,213 A | 12/1973 | Siclari et al. | |
| 3,819,585 A | 6/1974 | Funk et al. | |
| 3,849,379 A | 11/1974 | Jeurissen et al. | |
| 3,867,349 A | 2/1975 | Heeg et al. | |
| 3,892,798 A | 7/1975 | Heeg et al. | |
| 3,927,983 A | 12/1975 | Gordon et al. | |
| 3,960,820 A | 6/1976 | Pinney | |
| 3,988,301 A | 10/1976 | Jeurissen et al. | |
| 4,001,187 A | 1/1977 | Itabashi et al. | |
| 4,008,048 A | 2/1977 | Hellemans et al. | |
| 4,020,049 A | 4/1977 | Rinehart | |
| 4,028,307 A | 6/1977 | Ure | |
| 4,046,718 A | 9/1977 | Mass et al. | |
| 4,049,638 A | 9/1977 | Doerfel et al. | |
| 4,056,514 A | 11/1977 | Strehler et al. | |
| 4,064,112 A | 12/1977 | Rothe et al. | |
| 4,077,945 A | 3/1978 | Heinze et al. | |
| 4,079,046 A | 3/1978 | Brignac et al. | |
| 4,089,888 A | 5/1978 | Tokumitsu et al. | |

(Continued)

FOREIGN PATENT DOCUMENTS

BE            780142           3/1972

(Continued)

OTHER PUBLICATIONS

"Organic Chemistry" Stanley H. Pine fifth edition p. 970.*

(Continued)

*Primary Examiner*—Terressa Boykin
(74) *Attorney, Agent, or Firm*—Steven A. Owen; Bernard J. Graves, Jr.

(57) ABSTRACT

There are disclosed polyester processes using a pipe reactor and corresponding apparatuses. In particular, there are disclosed processes and corresponding apparatuses including an esterification pipe reactor operated in an upflow or downflow mode, especially in a regime including stratified flow.

260 Claims, 1 Drawing Sheet

U.S. PATENT DOCUMENTS

| | | | |
|---|---|---|---|
| 4,097,468 A | 6/1978 | James et al. |
| 4,100,142 A | 7/1978 | Schaefer et al. |
| 4,110,316 A | 8/1978 | Edging et al. |
| 4,118,582 A | 10/1978 | Walker |
| 4,122,112 A | 10/1978 | Koda et al. |
| 4,146,729 A | 3/1979 | Goodley et al. |
| 4,204,070 A | 5/1980 | Suzuki et al. |
| 4,212,963 A | 7/1980 | Lehr et al. |
| 4,223,124 A | 9/1980 | Broughton et al. |
| 4,230,818 A | 10/1980 | Broughton, Jr. et al. |
| 4,235,844 A | 11/1980 | Sterzel et al. |
| 4,238,593 A | 12/1980 | Duh |
| 4,254,246 A | 3/1981 | Dicoi et al. |
| 4,289,871 A | 9/1981 | Rowan et al. |
| 4,289,895 A | 9/1981 | Burkhardt et al. |
| 4,339,570 A | 7/1982 | Muschelknautz et al. |
| 4,346,193 A | 8/1982 | Warfel |
| 4,361,462 A | 11/1982 | Fuji et al. |
| 4,365,078 A | 12/1982 | Shelley |
| 4,382,139 A * | 5/1983 | Kapteina et al. ......... 528/502 F |
| 4,383,093 A | 5/1983 | Shiraki et al. |
| 4,410,750 A | 10/1983 | Langer, Jr. |
| 4,440,924 A | 4/1984 | Kuze et al. |
| 4,452,956 A | 6/1984 | Moked et al. |
| 4,472,558 A | 9/1984 | Casper et al. |
| 4,499,226 A | 2/1985 | Massey et al. |
| 4,542,196 A | 9/1985 | Morris et al. |
| 4,548,788 A | 10/1985 | Morris et al. |
| 4,550,149 A | 10/1985 | Morris et al. |
| 4,551,309 A | 11/1985 | Morris et al. |
| 4,551,510 A | 11/1985 | Morris et al. |
| 4,554,343 A | 11/1985 | Jackson, Jr. et al. |
| 4,555,384 A | 11/1985 | Morris et al. |
| 4,612,363 A | 9/1986 | Sasaki et al. |
| 4,670,580 A | 6/1987 | Maurer |
| 4,675,377 A | 6/1987 | Mobley et al. |
| 4,680,376 A | 7/1987 | Heinze et al. |
| 4,721,575 A | 1/1988 | Binning et al. |
| 4,952,627 A | 8/1990 | Morita et al. |
| 4,973,655 A | 11/1990 | Pipper et al. |
| 5,041,525 A | 8/1991 | Jackson |
| 5,064,935 A | 11/1991 | Jackson et al. |
| 5,162,488 A | 11/1992 | Mason |
| 5,185,426 A | 2/1993 | Verheijen et al. |
| 5,194,525 A | 3/1993 | Miura et al. |
| 5,243,022 A | 9/1993 | Kim et al. |
| 5,254,288 A | 10/1993 | Verheijen et al. |
| 5,294,305 A | 3/1994 | Craft, Sr. et al. |
| 5,300,626 A | 4/1994 | Jehl et al. |
| 5,340,906 A | 8/1994 | Shirokura et al. |
| 5,340,907 A | 8/1994 | Yau et al. |
| 5,384,389 A | 1/1995 | Alewelt et al. |
| 5,385,773 A | 1/1995 | Yau et al. |
| 5,413,861 A | 5/1995 | Gallo |
| 5,464,590 A | 11/1995 | Yount et al. |
| 5,466,419 A | 11/1995 | Yount et al. |
| 5,466,765 A | 11/1995 | Haseltine et al. |
| 5,466,776 A | 11/1995 | Krautstrunk et al. |
| 5,478,909 A | 12/1995 | Jehl et al. |
| 5,480,616 A | 1/1996 | Richardson et al. |
| 5,484,882 A | 1/1996 | Takada et al. |
| 5,496,469 A | 3/1996 | Scraggs et al. |
| 5,519,112 A | 5/1996 | Harazoe et al. |
| 5,573,820 A | 11/1996 | Harazoe et al. |
| 5,594,077 A | 1/1997 | Groth et al. |
| 5,602,216 A | 2/1997 | Juvet |
| 5,648,437 A | 7/1997 | Fischer et al. |
| 5,650,536 A | 7/1997 | Dankworth et al. |
| 5,681,918 A | 10/1997 | Adams et al. |
| 5,688,898 A | 11/1997 | Bhatia |
| 5,739,219 A | 4/1998 | Fischer et al. |
| 5,753,190 A | 5/1998 | Haseltine et al. |
| 5,753,784 A | 5/1998 | Fischer et al. |
| 5,786,443 A | 7/1998 | Lowe |
| 5,811,496 A | 9/1998 | Iwasyk et al. |
| 5,830,981 A | 11/1998 | Koreishi et al. |
| 5,849,849 A | 12/1998 | Bhatia |
| 5,898,058 A | 4/1999 | Nichols et al. |
| 5,902,865 A | 5/1999 | Gausepohl et al. |
| 5,905,096 A | 5/1999 | Lay et al. |
| 5,922,828 A | 7/1999 | Schiraldi |
| 5,932,105 A | 8/1999 | Kelly |
| 6,069,228 A | 5/2000 | Alsop et al. |
| 6,096,838 A | 8/2000 | Nakamoto et al. |
| 6,100,369 A | 8/2000 | Miyajima et al. |
| 6,103,859 A | 8/2000 | Jernigan et al. |
| 6,111,035 A | 8/2000 | Sakamoto et al. |
| 6,111,064 A | 8/2000 | Maurer et al. |
| 6,113,997 A | 9/2000 | Massey et al. |
| 6,127,493 A | 10/2000 | Maurer et al. |
| 6,174,970 B1 | 1/2001 | Braune |
| 6,252,034 B1 * | 6/2001 | Uenishi et al. ............. 528/196 |
| 6,339,031 B1 | 1/2002 | Tan |
| 6,355,738 B1 | 3/2002 | Nakamachi |
| 6,359,106 B1 | 3/2002 | Nakamoto |
| 6,399,031 B1 | 6/2002 | Herrmann et al. |
| 6,551,517 B1 | 4/2003 | Sentagnes et al. |
| 6,623,643 B1 | 9/2003 | Chisholm et al. |
| 6,861,494 B1 * | 3/2005 | Debruin ..................... 528/272 |
| 6,916,939 B1 | 7/2005 | Yamane et al. |
| 2002/0086969 A1 | 7/2002 | DeBruin |
| 2002/0091227 A1 | 7/2002 | DeBruin |
| 2002/0128399 A1 | 9/2002 | Nakamoto et al. |
| 2002/0137877 A1 | 9/2002 | Debruin |
| 2002/0180099 A1 | 12/2002 | Keillor, III |
| 2003/0037910 A1 | 2/2003 | Smyrnov |
| 2003/0133856 A1 | 7/2003 | Le |
| 2003/0191326 A1 * | 10/2003 | Yamane et al. ............. 549/267 |

FOREIGN PATENT DOCUMENTS

| | | |
|---|---|---|
| BR | 7906279 | 7/1981 |
| DE | 2200832 | 7/1973 |
| DE | 125 798 | 5/1977 |
| DE | 126 073 | 6/1977 |
| DE | 146 298 B | 2/1981 |
| DE | 206 558 | 2/1984 |
| DE | 229 415 A1 | 11/1985 |
| DE | 4235785 A1 | 5/1994 |
| DE | 195 37 930 A1 | 4/1997 |
| EP | 0070707 A1 | 1/1983 |
| EP | 0850962 A2 | 7/1998 |
| EP | 0 999 228 A2 | 5/2000 |
| EP | 1065193 A1 | 1/2001 |
| FR | 2168990 | 9/1973 |
| FR | 2302778 | 10/1976 |
| GB | 1013.34 | 12/1965 |
| GB | 1154538 | 6/1969 |
| GB | 2010294 A | 6/1979 |
| GB | 2 052 535 A | 1/1981 |
| GB | 2052535 A | 1/1981 |
| JP | 424993 B | 3/1967 |
| JP | 4218353 B | 9/1967 |
| JP | 4739043 A | 12/1972 |
| JP | 48 94795 A | 12/1973 |
| JP | 49 28698 A | 3/1974 |
| JP | 49 34593 A | 3/1974 |
| JP | 49 105893 A | 10/1974 |
| JP | 50 82197 A | 7/1975 |
| JP | 51 29460 A | 3/1976 |
| JP | 51 100036 A | 9/1976 |
| JP | 51 136788 A | 11/1976 |
| JP | 51 136789 A | 11/1976 |
| JP | 52 51495 A | 4/1977 |

| | | | |
|---|---|---|---|
| JP | 52 71432 A | 6/1977 |
| JP | 52 78845 A | 7/1977 |
| JP | 52 83424 A | 7/1977 |
| JP | 52 87133 A | 7/1977 |
| JP | 53 31793 A | 3/1978 |
| JP | 53 34894 A | 3/1978 |
| JP | 54 41833 A | 4/1979 |
| JP | 54 76535 A | 6/1979 |
| JP | 54 79242 A | 6/1979 |
| JP | 54 100494 A | 8/1979 |
| JP | 54 157536 A | 12/1979 |
| JP | 55 43128 A | 3/1980 |
| JP | 55 108422 A | 8/1980 |
| JP | 55135133 A | 10/1980 |
| JP | 58 129020 A | 8/1983 |
| JP | 59 47226 A | 3/1984 |
| JP | 59 53530 A | 3/1984 |
| JP | 59 68326 A | 4/1984 |
| JP | 59 71326 A | 4/1984 |
| JP | 60 15421 A | 1/1985 |
| JP | 60 72845 A | 4/1985 |
| JP | 60 115551 A | 6/1985 |
| JP | 60 120839 A | 6/1985 |
| JP | 60 163918 A | 8/1985 |
| JP | 60 226846 A | 11/1985 |
| JP | 62 207325 A | 9/1987 |
| JP | 62292831 | 12/1987 |
| JP | 64 56726 A | 3/1989 |
| JP | 1 102044 A | 4/1989 |
| JP | 3 192118 A | 8/1991 |
| JP | 3 292323 A | 12/1991 |
| JP | 5-78402 | 3/1993 |
| JP | 5 155994 A | 6/1993 |
| JP | 6 247899 A | 9/1994 |
| JP | 7 118208 A | 5/1995 |
| JP | 7 173268 A | 7/1995 |
| JP | 7 238151 A | 9/1995 |
| JP | 8 198960 A | 8/1996 |
| JP | 8 283398 A | 10/1996 |
| JP | 10 36495 A | 2/1998 |
| JP | 1998259244 A | 9/1998 |
| JP | 11 106489 A | 4/1999 |
| JP | 1999092555 A | 4/1999 |
| JP | 11 217429 A | 8/1999 |
| JP | 2000095851 A | 4/2000 |
| KR | 1993-0005144 B1 | 6/1993 |
| KR | 1994-0011540 B1 | 3/1994 |
| NL | 1001787 | 8/1965 |
| NL | 6704303 | 9/1967 |
| PL | 136188 | 8/1987 |
| SU | 973552 | 11/1982 |
| WO | WO 96/22318 | 7/1996 |
| WO | WO 98/08602 | 3/1998 |
| WO | WO 98/10007 | 3/1998 |
| WO | WO 99/16537 | 4/1999 |
| WO | WO 02/26841 A1 | 4/2002 |
| WO | WO 02/096975 A1 | 12/2002 |
| WO | WO 03/006526 A1 | 1/2003 |

OTHER PUBLICATIONS

Perry, Robert H. and Green, Don, "*Flow in Pipes and Channels*", Perry's Chemical Engineer's Handbook, (1984), pp. 5-23, 6th Edition, McGraw-Hill, United States.

Perry, Robert H. and Green, Don, "*Fluid and Particle Mechanics*", Perry's Chemical Engineer's Handbook, (1984), 5-40 to 5-41, 6th Edition, McGraw-Hill, United States.

Nauman, E. B., "*Enhancement of Heat Transfer and Thermal Homogenity with Motionless Mixers*", American Institute of Chemical Engineer's Journal, (1979), pp. 246-258, vol. 25, No. 2.

Brodkey, Robert S., "*Multiphase Phenomena I: Pipe Flow*", The Phenomena of Fluid Motions, (1967), pp. 456-538, Addison-Wesley Publishing Company, United States.

Gupta, S.K. and Kumar, Anil, "*Polyester Reactors*", Plenum Chemical Engineering Series, (1987), pp. 241-318, Chapter 8, Plenum Press, New York.

U.S. Appl. No. 10/456,212, filed Jun. 6, 2003, Debruin.

U.S. Appl. No. 10/456,448, filed Jun. 6, 2003, Debruin.

Robert H. Perry and Don Green, Perry's Chemical Engineers' Handbook, 6th Edition, pp. 5-40 and 5-41.

Perry's Chemical Engineers' Handbook, 7th Edition, pp. 14-82 to 14-95.

PCT International Search Report from U.S. Appl. No. 10/013,318, filed Dec. 2001.

U.S. Appl. No. 10/456,448, filed Dec. 7, 2004.

Stahl, Wegmann, Von Rohr; Tubular reactor for liquid reactions with gas release; Catalysis Today 79-80; 2003; pp. 89-95.

USPTO Office Action dated Apr. 10, 2006 for Application 10/919,931.

* cited by examiner

POLYESTER PROCESS USING A PIPE REACTOR

FIELD OF THE INVENTION

The invention relates to polyester processes using a pipe reactor and to corresponding apparatuses. More particularly, the invention relates to processes and to corresponding apparatuses including an esterification pipe reactor operated in an upflow or downflow mode, especially in a regime including stratified flow.

BACKGROUND OF THE INVENTION

As the business of manufacturing polyesters becomes more competitive, alternative processes have become highly desirable. Relevant background for this invention is given in a U.S. patent application related to the present one and filed the same day entitled "Polyester Process Using a Pipe Reactor" with the inventor, Bruce Roger DeBruin; this latter application is hereby incorporated by reference to the extent that it does not contradict the disclosures in the present application.

Another related U.S. patent application filed the same day as the present one and entitled, "Polyester Process Using a Pipe Reactor", with the inventors, Bruce Roger Debruin and Daniel Lee Martin is also hereby incorporated by reference to the extent that it does not contradict the disclosures in the present application.

In addition, related cases U.S. application Ser. No. 10/013,318 filed Dec. 7, 2001 and U.S. Provisional Application Ser. No. 60/254,040 filed Dec. 7, 2000 are both incorporated by reference to the extent that they do not contradict statements herein.

SUMMARY OF THE INVENTION

It is an object of this invention to provide polyester processes using a pipe reactor. Thus, this invention relates to a process for making a pre-polyester comprising: providing an esterification pipe reactor comprising a pipe, the pipe having an inlet and an outlet and constructed such that flow inside the pipe from the inlet to the outlet follows a path that is not totally vertical nor totally horizontal; and reacting one or more reactants flowing in the pipe towards the outlet under esterification reaction conditions to form the pre-polyester.

The invention also relates to similar processes wherein the pipe is constructed such that flow inside the pipe from the inlet to the outlet follows an overall upward (outlet higher than inlet), but not totally vertical path; this path may be in addition generally non-downward, non-vertical.

Further, the invention relates to any of these processes wherein stratified flow appears in the pipe.

Similarly, the invention relates to a process for making a polyester oligomer, a polyester or both comprising: performing any of the aforementioned processes for making a pre-polyester; and reacting the pre-polyester and optionally other reactants, under polycondensation reaction conditions, to form the polyester oligomer, the polyester or both.

The invention also relates to processes corresponding to those described here wherein the pipe is constructed such that flow inside the pipe from the inlet to the outlet follows an overall downward (outlet lower than inlet), but not totally vertical path; this path may be in addition generally non-upward, non-vertical.

A further object of this invention is to provide apparatuses for polyester processes using a pipe reactor. Thus, this invention relates to apparatuses corresponding to the processes described above.

BRIEF DESCRIPTION OF THE DRAWINGS

The accompanying drawings, which are incorporated in and constitute a part of this specification, illustrate several embodiments of the invention and together with the description serve to explain the principles of the invention.

KEY TO NUMBER DESIGNATIONS IN FIG. 1

Figure 1:
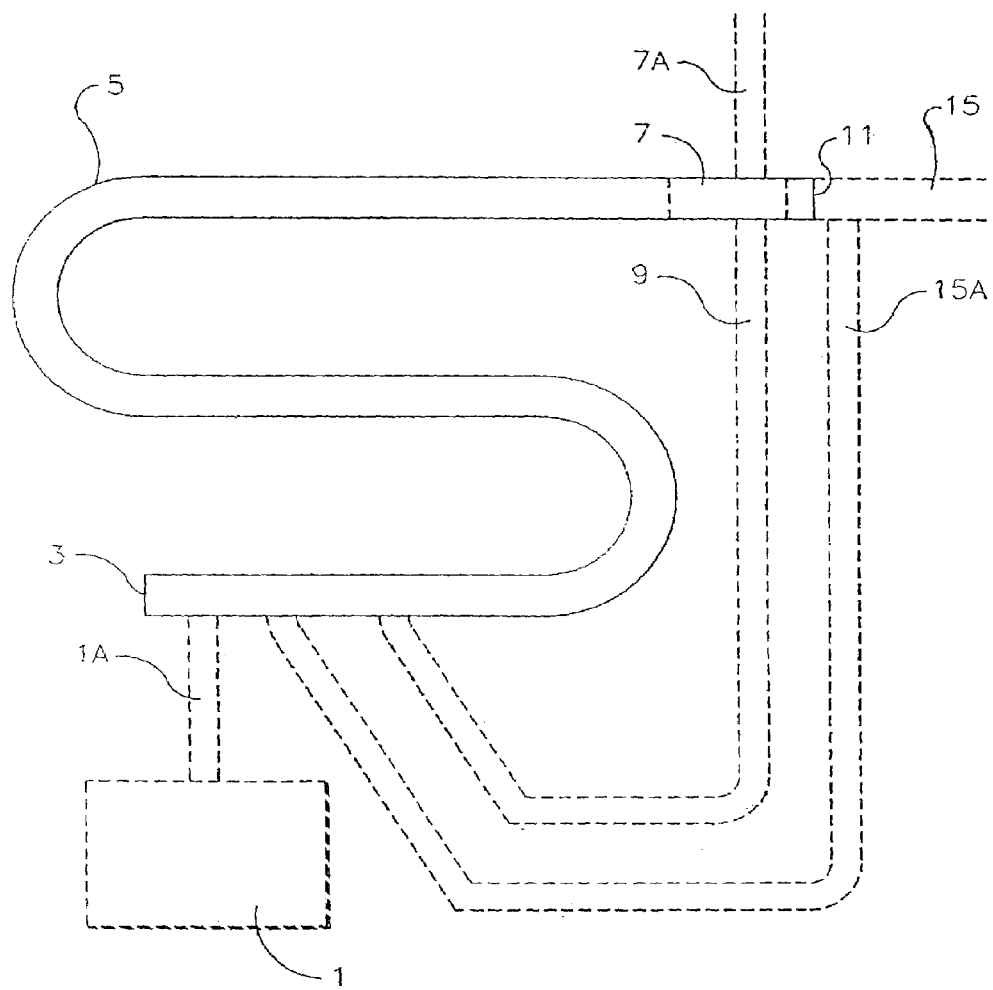
FIG. 1 shows typical embodiments of the polyester processes and apparatuses of the present invention.

1 tank (optional)
1A line from tank to pipe (optional)
3 pipe inlet
5 pipe of esterification pipe reactor
7 vapor disengager (optional)
7A vapor line (optional)
9 recycle line (optional)
11 pipe outlet
15 polycondensation reactor (optional and shown as a pipe reactor)
15A line from polycondensation reactor to pipe (optional)

DETAILED DESCRIPTION OF THE INVENTION

In this disclosure and the claims that follow, unless otherwise indicated, the term polyester is used in a broad sense and refers to a polymer containing more than 100 ester linkages (or more than 100 corresponding linkages in the case of derivatives of "straight" or "pure" polyesters such as polyetheresters, polyester amides and polyetherester amides). Similarly, polyester monomers would have 1 to 2 such linkages, polyester dimers 3 to 4 such linkages, polyester trimers 5 to 6 such linkages and polyester oligomers 7 to 100 such linkages. Pre-polyester refers to polyester monomers, dimers, trimers, oligomers and combinations of these.

For simplicity, polyester processes will be understood to include processes for making pre-polyesters when used in this disclosure and the claims that follow, unless indicated otherwise.

The processes according to the present invention include a process for making a pre-polyester comprising providing an esterification pipe reactor comprising a pipe, the pipe having an inlet and an outlet and constructed such that flow inside the pipe from the inlet to the outlet follows a path that is not totally vertical nor totally horizontal; and reacting one or more reactants flowing in the pipe towards the outlet under esterification reaction conditions to form the pre-polyester.

More specifically, the pipe may be constructed such that flow inside the pipe from the inlet to the outlet follows an overall upward (outlet higher than inlet), but not totally vertical path; this path may be in addition generally non-downward, non-vertical. Further, the pipe may substantially empty; that is substantially free of mechanical or structural internals (reactants and the like not included of course). The pipe is understood to be hollow in the context of this disclosure and the claims that follow.

For simplicity, esterification is taken to include, throughout this disclosure and the claims that follow, not only its common meaning, but ester exchange as well.

The processes according to the present invention also include processes for making a polyester oligomer, a polyester or both comprising performing (the steps of) any of the processes for making a pre-polyester previously described and reacting the pre-polyester and optionally other reactants, under polycondensation reaction conditions, to form the polyester oligomer, the polyester or both. This last mentioned step of reacting under polycondensation reaction conditions may be carried out in a polycondensation pipe reactor or other type of reactor for polycondensation.

The reactions taking place as part of the processes according to the present invention ordinarily produce water (and perhaps other types of) vapor, which unless removed, may significantly reduce product yield. Thus, the processes of the present invention may further comprise removing vapor from inside the pipe.

Given space limitation normally present at manufacturing sites, it may be convenient for the pipe to be serpentine; that is, having at least one bend. One preferred orientation for the pipe in accordance with this is shown in FIG. 1. The pipe 5 has several horizontal zones joined by bends.

In the reaction systems covered by the processes of the present invention, there may be solubility problems involving one or more reactants. For example, terephthalic acid is not very soluble in ethylene glycol, thus making it difficult to get the two to react in making polyethylene terephthalate. Thus, the processes of the present invention may further comprise adding a solubilizing agent into the pipe. For purposes here, a solubilizing agent makes one or more reactants more soluble in the other(s) or the reaction mixture generally; in this context (in reference to solubilizing agents), reactants will be taken as only those that are precursors for polyester monomers (as solubilizing agents are not such precursors). Suitable solubilizing agents include those comprising a polyester monomer, dimer and/or trimer; those comprising a polyester oligomer; those comprising a polyester; those comprising organic solvents such as chlorinated aromatics (like trichloro-benzene) and mixtures of phenol and chlorinated hydrocarbons (like tetrachloroethane), tetrahydrofuran or dimethyl sulfoxide; as well as those comprising combinations of these. Such agents comprising a polyester oligomer, especially of the type being produced in the process, are often preferred. These agents may be mixed with reactants prior to addition to the pipe or added to the pipe separately in whole or in part. If mixed with reactants (here polyester monomer precursors) in any way, the solubilizing agent would be considered to be the mixture less any such reactants.

Many different types of reactants or mixtures of reactants may be used in forming polyesters and pre-polyesters according to the processes of the present invention, the types or mixtures of reactants comprising a dicarboxylic acid (abbreviated here as a diacid), a diol, a diester, a hydroxy ester, a carboxylic acid ester (abbreviated here as an acid ester), a hydroxy carboxylic acid (abbreviated here as a hydroxy acid) or combinations thereof. It is possible that related materials such as tricarboxylic acids and other such multifunctional materials could also be employed. It should be understood that acid in this context would include corresponding mono, di or higher order salts. Of course, the pre-polyesters and polyesters being formed may be in turn reactants themselves.

More specific reactants or mixtures of reactants of interest comprise aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Such comprise terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, dipheny-3,4'-dicarboxylic acid, 2,2,-dimethyl-1,3-propandiol, dicarboxylic acid, succinic acid, glutaric acid, adipic acid, azelaic acid, sebacic acid, mixtures thereof, and the like. The acid component can be fulfilled by the ester thereof, such as with dimethyl terephthalate.

Further more specific reactants or mixtures of reactants comprise cycloaliphatic diols preferably having 6 to 20 carbon atoms or aliphatic diols preferably having 3 to 20 carbon atoms. Such comprise ethylene glycol (EG), diethylene glycol, triethylene glycol, 1,4-cyclohexane-dimethanol, propane-1,3-diol, butane-1,4-diol, pentane-1,5-diol, hexane-1,6-diol, neopentylglycol, 3-methylpentanedlol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4 tetramethylcyclobutanediol, 2,2-bis-(3-hydroxyethoxyphenyl)-propane, 2,2-bis-(4-hydroxypropoxyphenyl)-propane, isosorbide, hydroquinone, BDS-(2,2-(sulfonylbis)4, 1-phenyleneoxy))bis(ethanol), mixtures thereof, and the like. Pre-polyesters and polyesters may be prepared from one or more of the above type diols.

Some preferred comonomers comprise terephthalic acid, dimethyl terephthalate, isophthalic acid, dimethyl isophthalate, dimethyl-2,6-naphthalenedicarboxylate, 2,6-naphthalenedicarboxylic acid, ethylene glycol, diethylene glycol, 1,4-cyclohexane-dimethanol (CHDM), 1,4-butanediol, polytetramethyleneglyocl, trans-DMCD (trans-dimethyl-1,4-cyclohexane dicarboxylate), trimellitic anhydride, dimethyl cyclohexane-1,4-dicarboxylate, dimethyl decalin-2,6 dicarboxylate, decalin dimethanol, decahydronaphthalane 2,6-dicarboxylate, 2,6-dihydroxymethyl-decahydronaphthalene, hydroquinone, hydroxybenzoic acid, mixtures thereof, and the like. Bifunctional (A-B type where the ends are not the same) comonomers, such as hydroxybenzoic acid may also be included.

Some specific reactants or mixtures of reactants of very special interest comprise terephthalic acid (TPA; understood to include crude, purified (PTA) or that in between), dimethyl terephthalate (DMT), cyclohexane dimethanol (CHDM), isophthalic acid (IPA), ethylene glycol (EG) or combinations thereof.

Many types of polyesters may be made using the processes of the present invention. Two of special interest are polyethylene terephthalate (PET) and PETG (PET modified with CHDM).

Ranges stated in this disclosure and the claims that follow should be understood to disclose the entire range specifically and not just end points(s). For example, disclosure of the range 0 to 10 should be taken to specifically disclose 2, 2.5, and 3.17 and all other number subsumed in the range and not just 0 and 10. Further a disclosure of C1 to C5 (one to five carbon) hydrocarbons would be a specific disclosure of not only C1 and C5 hydrocarbons, but also of C2, C3, and C4 hydrocarbons; ranges that are clearly meant to be ranges of integers should be understood correspondingly.

One area of intense interest regarding polyester processes using a pipe reactor is the effect of flow regime in the pipe. Surprisingly, it has been determined that under many circumstances it may be desirable to operate the esterification pipe reactor, at least in part, in a stratified flow regime. Accordingly, the processes of the present invention include those previously described wherein stratified flow appears in the pipe (of an esterification pipe reactor). For this purpose, stratified flow may be defined as a flow pattern in a pipe in which liquid flows along the bottom and vapor flows over a liquid-vapor interface. Pipe reactors can be designed by those of ordinary skill in the art to meet this criteria in operation by application of standard engineering design techniques with reference to the disclosures herein.

In the systems considered here, operation so that stratified flow appears in the pipe will produce two, three or more phase systems.

Given different pipe designs, it may be desirable to operate with stratified flow in a certain given percentage or section(s) of the pipe. Calculations to determine needed parameters may be performed by those of ordinary skill in the art using standard engineering tools after consultation of the disclosures herein.

Esterification pipe reactors operated to produce liquid superficial velocities inside the pipe of less than 0.15 m/s and corresponding vapor superficial velocities less than 3.0 m/s, both across any full cross sectional area inside the pipe perpendicular to the (overall) flow path in the pipe (at that cross section) will in very many of the systems considered herein be in a stratified flow regime, at least in part. Even if not, the regime present should be acceptable. Thus, the processes of the present invention include those previously described wherein the liquid superficial velocity is less than 0.15 m/s (with one preferred range of 0.01 to 0.15 m/s for the liquid) and the vapor superficial velocity is less than 3.0 m/s (with one preferred range of 0.01 to 3.0 m/s and another of 0.6 to 3.0 m/s for the vapor) across any full cross sectional area inside the pipe perpendicular to the (overall) flow path in the pipe (at that cross section). (Of course, each phase must be moving at some point or there can be no stratified flow).

Given different pipe designs, it may be desirable to operate with superficial velocities as above in a certain given percentage or section(s) of the pipe. Calculations to determine needed parameters may be performed by those of ordinary skill in the art using standard engineering tools after consultation of the disclosures herein.

Two parameters of interest in the art relating to the present invention are the Baker plot parameters, $B_x$ and $B_y$. These are defined as $B_x=(G_L\lambda\psi)/G_G$, dimensionless and $B_y=(G_G/\lambda)$, lb/(sec ft$^2$)

where, $\lambda=(\rho'_c\rho_L')^{1/2}$; $\psi=(1/\sigma')(\mu'_L/(\rho'_L)^2)^{1/3}$; $G_G$=vapor mass velocity; $G_L$=liquid mass velocity; $\mu'_L$=ratio of liquid viscosity to water viscosity, dimensionless; $\rho'_c$=ratio of vapor density to air density, dimensionless; $\rho'_L$=ratio of liquid density to water density, dimensionless; $\sigma'$=ratio of liquid surface tension to water surface tension, dimensionless; and air and water properties are at 20° C. (68° F.) and 101.3 kPa (14.7 lbf/in$^2$). See Perry's Chemical Engineers' Handbook, 6th ed., pp 5–40 and 5–41, hereby incorporated by reference for this purpose.

Esterification pipe reactors operated such that $B_x$ is less than 4.0 while $B_y$ is less than 2.0 or $B_x$ is greater than or equal to 4.0 while ($\log_{10} B_y$) is less than or equal to −0.677(log 10 $B_x$)+0.700 on average across any full cross sectional area inside the pipe perpendicular to the (overall) flow path in the pipe (at that cross section) will in very many of the systems considered herein be in a stratified flow regime, at least in part. Even if not, the regime present should be acceptable. Thus, the processes of the present invention include those previously described wherein $B_x$ is less than 4.0 while $B_y$ is less than 2.0 or $B_x$ is greater than or equal to 4.0 while ($\log_{10} B_y$) is less than or equal to −0.677($\log_{10} B_x$)+0.700 on average across any full cross sectional area inside the pipe perpendicular to the (overall) flow path in the pipe (at that cross section).

Given different pipe designs, it may be desirable to operate with $B_x$ and $B_y$ as above in a certain given percentage or section(s) of the pipe. Calculations to determine needed parameters may be performed by those of ordinary skill in the art using standard engineering tools after consultation of the disclosures herein.

The processes according to the present invention also include those corresponding to those described above wherein the pipe is constructed such that flow inside the pipe from the inlet to the outlet follows an overall downward (outlet lower than inlet), but not totally vertical path and such path may be in addition generally non-upward, non-vertical.

The apparatuses according to the present invention include those corresponding to the processes of the present invention. In particular, an apparatus for making a pre-polyester comprising: an esterification pipe reactor comprising a pipe, the pipe having an inlet and an outlet and constructed such that flow inside the pipe from the inlet to the outlet follows a path that is not totally vertical nor totally horizontal, and wherein pre-polyester forming reactants are passed towards the outlet.

More specifically, the pipe may be constructed such that flow inside the pipe from the inlet to the outlet follows an overall upward, but not totally vertical path and this path may also be generally non-downward, non-vertical. The pipe may also be substantially empty (as defined previously).

The apparatuses according to the present invention also include those for making a polyester oligomer, a polyester or both comprising any of the apparatuses previously described and a polycondensation reactor connected to the outlet of the pipe; this last mentioned polycondensation pipe reactor may be a polycondensation pipe reactor or of any other type suitable for polycondensation.

In reference to the apparatuses of the present invention connected means directly or indirectly (through a bridging piece(s) of process equipment) in fluid communication.

As discussed previously, it is often important to remove vapor from inside the pipe, so the apparatuses of the present invention may further comprise means for removing vapor from inside the pipe at at least one point along the pipe. This point along the pipe could include the inlet or the outlet. In addition or instead of removal from the pipe, vapor could be removed outside of the pipe, generally and/or prior to polycondensation and/or during polycondensation. Means for such vapor removal include vapor disengagers, vents and other devices known in the art. See Perry's Chemical Engineers' Handbook, 7th ed., pp 14–82 to 14–95, hereby incorporated by reference for this purpose.

Also as discussed previously, the pipe may be serpentine.

One variation on the apparatuses of the present invention possible is the addition of a tank for holding solubilizing agent (which may be mixed with reactants (polyester monomer precursors here) if desired) that is connected to the pipe at a point other than the outlet. Further, a recycle line connecting the pipe at a point nearer to the outlet than the inlet with the pipe at a point nearer the inlet than the outlet could be employed at least for addition of recycle as a solubilizing agent to the pipe. Similarly, a flow line from the polycondensation reactor to the pipe at a point other than the outlet could also be added.

The apparatuses according to the present invention also include those corresponding to those described above wherein the pipe is constructed such that flow inside the pipe from the inlet to the outlet follows an overall downward, but not totally vertical path and such path may be in addition generally non-upward, non-vertical.

One special consideration for this last mentioned class of apparatuses according to the present invention is keeping the upper sections of the pipe from running dry when the pipe is serpentine. Thus, the apparatuses of the present invention include those further comprising means for removing vapor from the pipe at a least one bend and wherein the pipe is serpentine and has at least one weir at an effective distance from a bend. Means for vapor removal is as previously discussed. Effective distance for the weir refers to a hydraulically effective distance to achieve the objective of keeping the upper pipe sections from going totally dry; this can be determined by those of ordinary skill in the art using standard engineering methods following study of the disclosures herein.

FIG. 1 illustrates the apparatuses of the present invention as well as the corresponding processes. Optional tank 1 is for storage of solubilizing agent which may be mixed with reactants. It is connected (if present) by 1A to the pipe of the esterification pipe reactor 5. Pipe inlet 3 is where fresh reactants are ordinarily charged to the reactor and is a reference point for flow through the pipe 5. Pipe 5 is shown in a preferred orientation such that several horizontal sections are bridged by upward bends and the inlet 3 is below the pipe outlet 11 in elevation. During operation, reactants flow through the pipe 5 forming pre-polyester. Shown here near the pipe outlet 11 is an optional vapor disengager 7 and vapor line 7A for discharge of vapor from the flow in the pipe; as explained previously, vapor build up may negatively affect product yield in the reactor system. Flow through the pipe 5 leaves at the pipe outlet 11. Optionally, flow may be recycled through the recycle line 9. Flow from the pipe outlet 11 optionally enters the polycondensation reactor 15 (if present) which may be a polycondensation pipe reactor as shown. Optionally, some flow from the polycondnesation reactor 15 may be sent to the pipe 5 through the line 15A. Flows through 9 and 15A may act as solubilizing agents as discussed above.

EXAMPLES

The invention can be further illustrated by the following examples, but it should be understood that these examples are included merely for purposes of illustration and are not intended to limit the scope of the invention unless otherwise specifically indicated. Any titles in the examples are given for convenience and should not be taken as limiting.

Example 1

Using ASPEN modeling, exemplary volumes and pipe diameters were calculated for a commercial scale pipe reactor system for esterification of purified terephthalic acid (PTA) in ethylene glycol (EG). ASPEN Plus version 11.1 with Polymers Plus and ASPEN's PET Technology was used. The esterification reactor is modeled as a series of 5 CSTR reactor models followed by a plug flow reactor model. The results of the modeling and a pipe sizing for a stratified flow pipe reactor for esterification using polyester monomer recirculated from the exit to the entrance as a solubilizing agent for the feed PTA and taking off water vapor only at the end of the reactor length are shown in Table 1.

TABLE 1

| Example: | Calculations for esterification in a single recirculating pipe reactor with vapor takeoff only at the end of the reactor |
|---|---|
| PTA feed rate (lb/hr): | 31320 |
| Recirculation ratio (lbs of recirc/lb of product): | 4.0 |
| feed mole ratio (mole EG/mole PTA): | 1.6 |
| % conversion of acid end groups: | 96% |
| Temperature (° C.): | 285 |
| maximum pressure (psig): | 52.1 |
| recirculating reactor liquid volume (cu. ft): | 2648 |
| number of parallel pipes in reactor: | 16 |
| recirculating reactor pipe diameter (in): | 16 |
| recirculating reactor maximum liquid superficial velocity (ft/s): | 0.03 |
| recirculating reactor maximum vapor superficial velocity (ft/s): | 9.8 |

Example 2

Using ASPEN modeling, exemplary volumes and pipe diameters were calculated for a commercial scale pipe reactor system for esterification of purified terephthalic acid (PTA) in ethylene glycol (EG). ASPEN Plus version 11.1 with Polymers Plus and ASPEN's PET Technology was used. The esterification reactor is modeled as a series of 5 CSTR reactor models followed by a plug flow reactor model. The results of the modeling and a pipe sizing for a stratified flow pipe reactor for esterification using polyester monomer recirculated from the exit to the entrance as a solubilizing agent for the feed PTA are shown in Table 2. This example shows the efficiency effects of a single vapor takeoff added in the middle of the reactor length.

TABLE 2

| Example: | Calculations for esterification in a single recirculating pipe reactor with vapor takeoff in the middle of the reactor and at the end of the reactor |
|---|---|
| PTA feed rate (lb/hr): | 31320 |
| Recirculation ratio (lbs of recirc/lb of product): | 4.0 |
| feed mole ratio (mole EG/mole PTA): | 1.6 |
| % conversion of acid end groups: | 96% |
| Temperature (° C.): | 285 |
| maximum pressure (psig): | 52.1 |
| recirculating reactor liquid volume (cu. ft): | 1236 |
| number of parallel pipes in reactor: | 12 |
| recirculating reactor diameter (in): | 16 |
| recirculating reactor maximum liquid superficial velocity (ft/s): | 0.05 |
| recirculating reactor maximum vapor superficial velocity (ft/s): | 10.8 |

Example 3

Using ASPEN modeling, exemplary volumes and pipe diameters were calculated for a commercial scale pipe reactor system for esterification of purified terephthalic acid (PTA) in ethylene glycol (EG). ASPEN Plus version 11.1 with Polymers Plus and ASPEN's PET Technology was used. The esterification reactor is modeled as a series of 5 CSTR reactor models followed by a plug flow reactor model. The results of the modeling and a pipe sizing for a series of stratified flow pipe reactors for esterification using polyester monomer recirculated from the exit of the first pipe reactor to the entrance of the first pipe reactor as a solubilizing agent for the feed PTA are shown in Table 3. This example shows the optimization effects of using recirculation only as required for solubility concerns and using plug reaction profile with no recirculation as much as possible.

TABLE 3

| Example: | Calculations for single recirculating pipe reactor with two vapor takeoffs followed by plug flow pipe optimized for total volume |
|---|---|
| PTA feed rate (lb/hr): | 31320 |
| Recirculation ratio (lbs of recirc/lb of product): | 4.0 |
| feed mole ratio (mole EG/mole PTA): | 1.6 |
| % conversion of acid end groups: | 96% |
| Temperature (° C.): | 285 |
| maximum pressure (psig): | 52.1 |
| recirculating reactor liquid volume (cu. ft): | 318 |
| plug flow reactor liquid volume (cu. ft): | 353 |
| number of parallel pipes in recirculating reactor: | 8 |
| recirculating reactor diameter (in): | 16 |
| recirculating reactor maximum liquid superficial velocity (ft/s): | 0.07 |
| recirculating reactor maximum vapor superficial velocity (ft/s): | 5.5 |
| number of parallel pipes in plug flow reactor: | 6 |
| plug flow reactor diameter (in): | 12 |
| plug flow reactor maximum liquid superficial velocity (ft/s): | 0.03 |
| plug flow reactor maximum vapor superficial velocity (ft/s): | 1.8 |

Example 4

Lab-Model Comparison

Lab Scale Reactor

A lab scale esterification pipe reactor was built to demonstrate such esterification of PTA and EG in a laboratory setting. The lab unit consisted of a pipe reactor made of 664.75 inches of 0.5" 18 BWG stainless tubing heated by electric tracing, a 1200 ml receiver with agitator for receiving the output of the pipe reactor and acting as a disengagement zone to allow the removal of vapors, a recirculating monomer gear pump which pumps liquid oligomer from the receiver back into the inlet of the pipe reactor, and a PTA/EG paste feed system which feed raw materials into the recirculating loop.

The reactor was started by charging a PTA based CHDM modified (2.5 weight percent) oligomer of approximately 96% conversion into the receiver (C-01) and filling the pipe reactor with this oligomer in recirculating mode. After recirculating the oligomer at temperature, a PTA/EG paste feed was introduced into the recirculating flow. After the reactor reached steady state, samples were taken from the C-01 receiver at a rate equal to the product generation rate.

These samples were analyzed for percent conversion by proton NMR analysis to determine the extent of reaction that took place in the pipe reactor. Percent Conversion based on Esters were determined by Proton NMR using a Trifluoroacetic Anhydride Method.

Ten mg of the sample to be analyzed is dissolved in 1 ml of a solvent mixture of chloroform-d with 0.05% Tetramethylsilane (TMS)/trifluoroacetic acid-d/trifluoroacetic anhydride in a 72/22/8 volume ratio. The mixture is heated to 50° C. and stirred as needed to completely dissolve the sample to be analyzed.

The appropriate amount of the sample solution is transferred into a 5 mm NMR tube and the tube is capped. The proton NMR signal is recorded using an average of 64 signals collections. The NMR signal using a 600 MHz NMR and a NMR pulse sequence is collected which gives quantitative proton NMR signals and also decouples the carbon 13 NMR frequencies. The NMR spectrum is analyzed by measuring the correct areas calculating the percent conversion of acid groups to ester groups by the areas and calculations below:

Areas between the following chemical shift points referenced to TMS are measured, and percent conversion calculated using the formula.

Area A=7.92 ppm to 8.47 ppm

Area B=5.01 ppm to a valley between 4.82 and 4.77 ppm

Area C=4.82 ppm to a valley between 4.74 and 4.69 ppm

Area D=A valley between 4.28 ppm and 4.18 ppm to a valley between 4.10 and 4.16 ppm Area E=A valley between 4.10 ppm and 4.16 ppm to a valley between 4.0 and 4.08 ppm Area F=8.6 ppm to 8.9 ppm Area G=7.55 ppm to 7.8 ppm Percent Conversion=100*(B+(0.5° C.)+D+(0.5*E))/(A+F+G)

The samples were also analyzed by gas chromatograph for percent DEG by mass to determine the rate of the side reaction. The effect of residence time and recirculation ratio was seen by varying the feed rate of the paste.

Results from laboratory runs can be seen in Table 4 below.

TABLE 4

| Experiment | Temp (° C.) | Pressure (psig) | Recirc Rate (lbs./hr) | Paste Feed Rate (lbs./hr) | Feed Mole Ratio (EG/PTA) | Measured % Conversion | Measured weight % DEG |
|---|---|---|---|---|---|---|---|
| 1 | 285 | 0 | 67 | 1 | 1.8 | 94.2% | 1.1% |
| 2 | 285 | 0 | 67 | 1 | 1.8 | 93.7% | 1.1% |
| 3 | 285 | 0 | 67 | 1 | 1.8 | 92.5% | 1.4% |
| 4 | 285 | 0 | 67 | 1.5 | 1.8 | 92.7% | 1.0% |
| 5 | 285 | 0 | 67 | 2 | 1.8 | 90.9% | 0.6% |
| 6 | 285 | 0 | 67 | 2.5 | 1.8 | 87.2% | 0.7% |
| 7 | 285 | 0 | 67 | 3 | 1.8 | 64.2% | 0.2% |

TABLE 4-continued

| Experiment | Temp (° C.) | Pressure (psig) | Recirc Rate (lbs./hr) | Paste Feed Rate (lbs./hr) | Feed Mole Ratio (EG/PTA) | Measured % Conversion | Measured weight % DEG |
|---|---|---|---|---|---|---|---|
| 8 | 285 | 0 | 67 | 3.5 | 1.8 | 67.1% | 0.6% |
| 9 | 285 | 0 | 67 | 4 | 1.8 | 51.9% | 0.3% |
| 10 | 285 | 0 | 67 | 3.5 | 1.8 | 77.4% | 0.3% |

Model Comparison

An ASPEN model was used to simulate the lab apparatus previously described in this example. In this case, ASPEN 11.1 with Polymers Plus, and ASPEN's PET Technology was used for the modeling with a model configuration similar to the one described for examples 1–3. Neither model configuration nor software were significantly different from that used in examples 1–3. In order to correctly simulate the dissolution of PTA into the oligomer at different conditions in the lab, it was sometimes necessary to add dissolution kinetics to the model. Table 5 shows three comparisons of lab runs with the model without dissolution kinetics included; this model was found to be of reasonable accuracy when the experimental conditions resulted in completely dissolved PTA as in these runs. Table 5 also shows two examples of comparisons of lab runs with the model including the dissolution kinetics; this model including the dissolution kinetics closely matches the measured conversion when free PTA is present at the end of the lab scale pipe reactor as in these runs. Conversion is defined in this context as the percentage of reactive (acid if use PTA as here) end groups in the liquid phase that are esterified as measured at the outlet of reactor.

TABLE 5

| Paste feed (g/min) | Monomer Circulation (g/min) | Temp. ° C | Paste Mole Ratio (EG/PTA) | Unreacted PTA Weight % | Model Predicted % Conversion | Measured % Conversion |
|---|---|---|---|---|---|---|
| Completely Dissolved PTA - No Dissolution Kinetics in Model ||||||||
| 8 | 507 | 263.2 | 1.8 | 0.00 | 97.053 | 95.170 |
| 8 | 507 | 253.9 | 1.8 | 0.00 | 96.645 | 93.750 |
| 15 | 507 | 265.5 | 1.8 | 0.00 | 96.269 | 91.630 |
| PTA Not Completely Dissolved/Dissolution Kinetics in Model ||||||||
| 19 | 507 | 261.5 | 1.8 | 2.93 | 90.935 | 86.500 |
| 15 | 507 | 261.5 | 1.8 | 3.34 | 90.228 | 85.490 |

The specific embodiments described and shown in the specification and drawings should be taken as illustrative of the present invention and not for purposes of limiting the claims that follow, unless specifically indicated otherwise.

What is claimed is:

1. A process for making a pre-polyester comprising:
providing an esterification pipe reactor comprising a pipe, the pipe having an inlet and an outlet, the pipe including at least one substantially horizontal section, and the pipe being constructed such that flow inside the pipe from the inlet to the outlet follows a path that is not totally vertical nor totally horizontal; and
reacting one or more reactants flowing in the pipe towards the outlet under esterification reaction conditions to form the pre-polyester, wherein said reactants flow in two-phase liquid/vapor flow in at least a portion of the substantially horizontal section of the pipe.

2. The process of claim 1 wherein the pipe is constructed such that flow inside the pipe from the inlet to the outlet follows an overall upward, but not totally vertical path.

3. The process of claim 2 wherein the pipe is substantially devoid of rigid internal structures.

4. The process of claim 2 wherein the pipe is constructed such that flow inside the pipe from the inlet to the outlet follows an overall upward, but not totally vertical path, with this path being also generally non-downward, non-vertical.

5. The process of claim 4 wherein the pipe is substantially devoid of rigid internal structures.

6. A process for making a polyester oligomer, a polyester or both comprising:
performing the process according to claim 2 to make a pre-polyester; and
reacting the pre-polyester and optionally other reactants, under polycondensation reaction conditions, to form the polyester oligomer, the polyester or both.

7. The process of claim 6 wherein the step of reacting under polycondensation reaction conditions is carried out in a polycondensation pipe reactor.

8. A process for making a polyester oligomer, a polyester or both comprising:
performing the process according to claim 3 to make a pre-polyester; and
reacting the pre-polyester and optionally other reactants, under polycondensation reaction conditions, to form the polyester oligomer, the polyester or both.

9. The process of claim 8 wherein the step of reacting under polycondensation reaction conditions is carried out in a polycondensation pipe reactor.

10. A process for making a polyester oligomer, a polyester or both comprising:
performing the process according to claim 4 to make a pre-polyester; and
reacting the pre-polyester and optionally other reactants, under polycondensation reaction conditions, to form the polyester oligomer, the polyester or both.

11. The process of claim 10 wherein the step of reacting under polycondensation reaction conditions is carried out in a polycondensation pipe reactor.

12. A process for making a polyester oligomer, a polyester or both comprising:
performing the process according to claim 5 to make a pre-polyester; and
reacting the pre-polyester and optionally other reactants, under polycondensation reaction conditions, to form the polyester oligomer, the polyester or both.

13. The process of claim 12 wherein the step of reacting under polycondensation reaction conditions is carried out in a polycondensation pipe reactor.

14. The process of claim 2 further comprising removing vapor from inside the pipe.

15. The process of claim 3 further comprising removing vapor from inside the pipe.

16. The process of claim 4 further comprising removing vapor from inside the pipe.

17. The process of claim 5 further comprising removing vapor from inside the pipe.

18. A process for making a polyester oligomer, a polyester or both comprising:
performing the process according to claim 14 to make a pre-polyester; and
reacting the pre-polyester and optionally other reactants, under polycondensation reaction conditions, to form the polyester oligomer, the polyester or both.

19. A process for making a polyester oligomer, a polyester or both comprising:
performing the process according to claim 17 to make a pre-polyester; and
reacting the pre-polyester and optionally other reactants, under polycondensation reaction conditions, to form the polyester oligomer, the polyester or both.

20. The process of claim 2 wherein the pipe has a generally serpentine shape.

21. The process of claim 3 wherein the pipe has a generally serpentine shape.

22. The process of claim 4 wherein the pipe has a generally serpentine shape.

23. The process of claim 5 wherein the pipe has a generally serpentine shape.

24. The process of claim 2 further comprising adding a solubilizing agent into the pipe.

25. The process of claim 3 further comprising adding a solubilizing agent into the pipe.

26. The process of claim 4 further comprising adding a solubilizing agent into the pipe.

27. The process of claim 5 further comprising adding a solubilizing agent into the pipe.

28. A process for making a polyester oligomer, a polyester or both comprising:
performing the process according to claim 24 to make a pre-polyester; and
reacting the pre-polyester and optionally other reactants, under polycondensation reaction conditions, to form the polyester oligomer, the polyester or both.

29. A process for making a polyester oligomer, a polyester or both comprising:
performing the process according to claim 27 to make a pre-polyester; and
reacting the pre-polyester and optionally other reactants, under polycondensation reaction conditions, to form the polyester oligomer, the polyester or both.

30. The process of claim 24 wherein the solubilizing agent comprises a polyester oligomer.

31. The process of claim 25 wherein the solubilizing agent comprises a polyester oligomer.

32. The process of claim 26 wherein the solubilizing agent comprises a polyester oligomer.

33. The process of claim 27 wherein the solubilizing agent comprises a polyester oligomer.

34. A process for making a polyester oligomer, a polyester or both comprising:
performing the process according to claim 30 to make a pre-polyester; and
reacting the pre-polyester and optionally other reactants, under polycondensation reaction conditions, to form the polyester oligomer, the polyester or both.

35. A process for making a polyester oligomer, a polyester or both comprising:
performing the process according to claim 33 to make a pre-polyester; and
reacting the pre-polyester and optionally other reactants, under polycondensation reaction conditions, to form the polyester oligomer, the polyester or both.

36. The process of claim 2 wherein the reactants forming the pre-polyester comprise a diacid, a diol, a diester, a hydroxy ester, an acid ester, a hydroxy acid or combinations thereof.

37. The process of claim 3 wherein the reactants forming the pre-polyester comprise a diacid, a diol, a diester, a hydroxy ester, an acid ester, a hydroxy acid or combinations thereof.

38. The process of claim 4 wherein the reactants forming the pre-polyester comprise a diacid, a diol, a diester, a hydroxy ester, an acid ester, a hydroxy acid or combinations thereof.

39. The process of claim 5 wherein the reactants forming the pre-polyester comprise a diacid, a diol, a diester, a hydroxy ester, an acid ester, a hydroxy acid or combinations thereof.

40. A process for making a polyester oligomer, a polyester or both comprising:
performing the process according to claim 36 to make a pre-polyester; and
reacting the pre-polyester and optionally other reactants, under polycondensation reaction conditions, to form the polyester oligomer, the polyester or both.

41. A process for making a polyester oligomer, a polyester or both comprising:
performing the process according to claim 39 to make a pre-polyester; and
reacting the pre-polyester and optionally other reactants, under polycondensation reaction conditions, to form the polyester oligomer, the polyester or both.

42. The process of claim 2 wherein the reactants forming the pre-polyester comprise TPA, DMT, CHDM, IPA, EG or combinations thereof.

43. The process of claim 3 wherein the reactants forming the pre-polyester comprise TPA, DMT, CHDM, IPA, EG or combinations thereof.

44. The process of claim 4 wherein the reactants forming the pre-polyester comprise TPA, DMT, CHDM, IPA, EG or combinations thereof.

45. The process of claim 5 wherein the reactants forming the pre-polyester comprise TPA, DMT, CHDM, IPA, EG or combinations thereof.

46. A process for making a polyester oligomer, a polyester or both comprising:
performing the process according to claim 42 to make a pre-polyester; and
reacting the pre-polyester and optionally other reactants, under polycondensation reaction conditions, to form the polyester oligomer, the polyester or both.

47. A process for making a polyester oligomer, a polyester or both comprising:
performing the process according to claim 45 to make a pre-polyester; and
reacting the pre-polyester and optionally other reactants, under polycondensation reaction conditions, to form the polyester oligomer, the polyester or both.

48. The process of claim 2 further comprising adding a solubilizing agent comprising a polyester oligomer into the pipe and wherein the reactants forming the pre-polyester comprise TPA, DMT, CHDM, IPA, EG or combinations thereof.

49. The process of claim 3 further comprising adding a solubilizing agent comprising a polyester oligomer into the pipe and wherein the reactants forming the pre-polyester comprise TPA, DMT, CHDM, IPA, EG or combinations thereof.

50. The process of claim 4 further comprising adding a solubilizing agent comprising a polyester oligomer into the pipe and wherein the reactants forming the pre-polyester comprise TPA, DMT, CHDM, IPA, EG or combinations thereof.

51. The process of claim 5 further comprising adding a solubilizing agent comprising a polyester oligomer into the pipe and wherein the reactants forming the pre-polyester comprise TPA, DMT, CHDM, IPA, EG or combinations thereof.

52. The process of claim 14 further comprising adding a solubilizing agent comprising a polyester oligomer into the pipe and wherein the reactants forming the pre-polyester comprise TPA, DMT, CHDM, IPA, EG or combinations thereof.

53. The process of claim 15 further comprising adding a solubilizing agent comprising a polyester oligomer into the pipe and wherein the reactants forming the pre-polyester comprise TPA, DMT, CHDM, IPA, EG or combinations thereof.

54. The process of claim 16 further comprising adding a solubilizing agent comprising a polyester oligomer into the pipe and wherein the reactants forming the pre-polyester comprise TPA, DMT, CHDM, IPA, EG or combinations thereof.

55. The process of claim 17 further comprising adding a solubilizing agent comprising a polyester oligomer into the pipe and wherein the reactants forming the pre-polyester comprise TPA, DMT, CHDM, IPA, EG or combinations thereof.

56. A process for making a polyester oligomer, a polyester or both comprising:
    performing the process according to claim 48 to make a pre-polyester; and
    reacting the pre-polyester and optionally other reactants, under polycondensation reaction conditions, to form the polyester oligomer, the polyester or both.

57. A process for making a polyester oligomer, a polyester or both comprising:
    performing the process according to claim 51 to make a pre-polyester; and
    reacting the pre-polyester and optionally other reactants, under polycondensation reaction conditions, to form the polyester oligomer, the polyester or both.

58. A process for making a polyester oligomer, a polyester or both comprising:
    performing the process according to claim 52 to make a pre-polyester; and
    reacting the pre-polyester and optionally other reactants, under polycondensation reaction conditions, to form the polyester oligomer, the polyester or both.

59. A process for making a polyester oligomer, a polyester or both comprising:
    performing the process according to claim 55 to make a pre-polyester; and
    reacting the pre-polyester and optionally other reactants, under polycondensation reaction conditions, to form the polyester oligomer, the polyester or both.

60. The process of claim 6 wherein the polyester is PET or PETG.

61. The process of claim 7 wherein the polyester is PET or PETG.

62. The process of claim 8 wherein the polyester is PET or PETG.

63. The process of claim 9 wherein the polyester is PET or PETG.

64. The process of claim 10 wherein the polyester is PET or PETG.

65. The process of claim 11 wherein the polyester is PET or PETG.

66. The process of claim 12 wherein the polyester is PET or PETG.

67. The process of claim 13 wherein the polyester is PET or PETG.

68. The process of claim 2 wherein stratified flow appears in the pipe.

69. The process of claim 3 wherein stratified flow appears in the pipe.

70. The process of claim 4 wherein stratified flow appears in the pipe.

71. The process of claim 5 wherein stratified flow appears in the pipe.

72. A process for making a polyester oligomer, a polyester or both comprising:
    performing the process according to claim 68 to make a pre-polyester; and
    reacting the pre-polyester and optionally other reactants, under polycondensation reaction conditions, to form the polyester oligomer, the polyester or both.

73. A process for making a polyester oligomer, a polyester or both comprising:
    performing the process according to claim 69 to make a pre-polyester; and
    reacting the pre-polyester and optionally other reactants, under polycondensation reaction conditions, to form the polyester oligomer, the polyester or both.

74. A process for making a polyester oligomer, a polyester or both comprising:
    performing the process according to claim 70 to make a pre-polyester; and
    reacting the pre-polyester and optionally other reactants, under polycondensation reaction conditions, to form the polyester oligomer, the polyester or both.

75. A process for making a polyester oligomer, a polyester or both comprising:
    performing the process according to claim 71 to make a pre-polyester; and
    reacting the pre-polyester and optionally other reactants, under polycondensation reaction conditions, to form the polyester oligomer, the polyester or both.

76. The process of claim 2 wherein the liquid superficial velocity is between 0.01 and 0.15 m/s and the vapor superficial velocity is between 0.6 and 3.0 m/s across any full cross sectional area inside the pipe perpendicular to the flow path in the pipe.

77. The process of claim 3 wherein the liquid superficial velocity is between 0.01 and 0.15 m/s and the vapor superficial velocity is between 0.6 and 3.0 m/s across any full cross sectional area inside the pipe perpendicular to the flow path in the pipe.

78. The process of claim 4 wherein the liquid superficial velocity is between 0.01 and 0.15 m/s and the vapor superficial velocity is between 0.6 and 3.0 m/s across any full cross sectional area inside the pipe perpendicular to the flow path in the pipe.

79. The process of claim 5 wherein the liquid superficial velocity is between 0.01 and 0.15 m/s and the vapor superficial velocity is between 0.6 and 3.0 m/s across any full cross sectional area inside the pipe perpendicular to the flow path in the pipe.

80. A process for making a polyester oligomer, a polyester or both comprising:
performing the process according to claim 76 to make a pre-polyester; and
reacting the pre-polyester and optionally other reactants, under polycondensation reaction conditions, to form the polyester oligomer, the polyester or both.

81. A process for making a polyester oligomer, a polyester or both comprising:
performing the process according to claim 77 to make a pre-polyester; and
reacting the pre-polyester and optionally other reactants, under polycondensation reaction conditions, to form the polyester oligomer, the polyester or both.

82. A process for making a polyester oligomer, a polyester or both comprising:
performing the process according to claim 78 to make a pre-polyester; and
reacting the pre-polyester and optionally other reactants, under polycondensation reaction conditions, to form the polyester oligomer, the polyester or both.

83. A process for making a polyester oligomer, a polyester or both comprising:
performing the process according to claim 79 to make a pre-polyester; and
reacting the pre-polyester and optionally other reactants, under polycondensation reaction conditions, to form the polyester oligomer, the polyester or both.

84. The process of claim 2 wherein flow through the pipe reactor is defined by Baker plot parameters $B_x$ and $B_y$, and wherein $B_x$ is less than 4.0 while $B_y$ is less than 2.0 or $B_x$ is greater than or equal to 4.0 while $(\log_{10} B_y)$ is less than or equal to $-0.677(\log_{10} B_x)+0.700$ on average across any full cross sectional area inside the pipe perpendicular to the flow path in the pipe.

85. The process of claim 3 wherein flow through the pipe reactor is defined by Baker plot parameters $B_x$ and $B_y$, and wherein $B_x$ is less than 4.0 while $B_y$ is less than 2.0 or $B_x$ is greater than or equal to 4.0 while $(\log_{10} B_y)$ is less than or equal to $-0.677(\log_{10} B_x)+0.700$ on average across any full cross sectional area inside the pipe perpendicular to the flow path in the pipe.

86. The process of claim 4 wherein flow through the pipe reactor is defined by Baker plot parameters $B_x$ and $B_y$, and wherein $B_x$ is less than 4.0 while $B_y$ is less than 2.0 or $B_x$ is greater than or equal to 4.0 while $(\log_{10} B_y)$ is less than or equal to $-0.677(\log_{10} B_x)+0.700$ on average across any full cross sectional area inside the pipe perpendicular to the flow path in the pipe.

87. The process of claim 5 wherein flow through the pipe reactor is defined by Baker plot parameters $B_x$ and $B_y$, and wherein $B_x$ is less than 4.0 while $B_y$ is less than 2.0 or $B_x$ is greater than or equal to 4.0 while $(\log_{10} B_y)$ is less than or equal to $-0.677(\log_{10} B_x)+0.700$ on average across any full cross sectional area inside the pipe perpendicular to the flow path in the pipe.

88. A process for making a polyester oligomer, a polyester or both comprising:
performing the process according to claim 84 to make a pre-polyester; and
reacting the pre-polyester and optionally other reactants, under polycondensation reaction conditions, to form the polyester oligomer, the polyester or both.

89. A process for making a polyester oligomer, a polyester or both comprising:
performing the process according to claim 85 to make a pre-polyester; and
reacting the pre-polyester and optionally other reactants, under polycondensation reaction conditions, to form the polyester oligomer, the polyester or both.

90. A process for making a polyester oligomer, a polyester or both comprising:
performing the process according to claim 86 to make a pre-polyester; and
reacting the pre-polyester and optionally other reactants, under polycondensation reaction conditions, to form the polyester oligomer, the polyester or both.

91. A process for making a polyester oligomer, a polyester or both comprising:
performing the process according to claim 87 to make a pre-polyester; and
reacting the pre-polyester and optionally other reactants, under polycondensation reaction conditions, to form the polyester oligomer, the polyester or both.

92. The process of claim 48 wherein stratified flow appears in the pipe.

93. The process of claim 51 wherein stratified flow appears in the pipe.

94. A process for making a polyester oligomer, a polyester or both comprising:
performing the process according to claim 93 to make a pre-polyester; and
reacting the pre-polyester and optionally other reactants, under polycondensation reaction conditions, to form the polyester oligomer, the polyester or both.

95. The process of claim 45 wherein the pipe has a generally serpentine shape and stratified flow appears in the pipe.

96. The process of claim 51 wherein the pipe has a generally serpentine shape and stratified flow appears in the pipe.

97. The process of claim 47 wherein the pipe has a generally serpentine shape and stratified flow appears in the pipe.

98. The process of claim 97 wherein the step of reacting under polycondensation reaction conditions is carried out in a polycondensation pipe reactor.

99. The process of claim 59 wherein the pipe has a generally serpentine shape and stratified flow appears in the pipe, the step of reacting under polycondensation reaction conditions is carried out in a polycondensation pipe reactor and the polyester is PET.

100. The process of claim 1 wherein the pipe is constructed such that flow inside the pipe from the inlet to the outlet follows an overall downward, but not totally vertical path.

101. The process of claim 100 wherein the pipe is substantially devoid of rigid internal structures.

102. The process of claim 100 wherein the pipe is constructed such that flow inside the pipe from the inlet to the outlet follows an overall downward, but not totally vertical path, with this path being also generally non-upward, non-vertical.

103. The process of claim 102 wherein the pipe is substantially devoid of rigid internal structures.

104. A process for making a polyester oligomer, a polyester or both comprising:
performing the process according to claim 100 to make a pre-polyester; and
reacting the pre-polyester and optionally other reactants, under polycondensation reaction conditions, to form the polyester oligomer, the polyester or both.

105. The process of claim 104 wherein the step of reacting under polycondensation reaction conditions is carried out in a polycondensation pipe reactor.

106. A process for making a polyester oligomer, a polyester or both comprising:
performing the process according to claim 101 to make a pre-polyester; and
reacting the pre-polyester and optionally other reactants, under polycondensation reaction conditions, to form the polyester oligomer, the polyester or both.

107. The process of claim 106 wherein the step of reacting under polycondensation reaction conditions is carried out in a polycondensation pipe reactor.

108. A process for making a polyester oligomer, a polyester or both comprising:
performing the process according to claim 102 to make a pre-polyester; and
reacting the pre-polyester and optionally other reactants, under polycondensation reaction conditions, to form the polyester oligomer, the polyester or both.

109. The process of claim 108 wherein the step of reacting under polycondensation reaction conditions is carried out in a polycondensation pipe reactor.

110. A process for making a polyester oligomer, a polyester or both comprising:
performing the process according to claim 103 to make a pre-polyester; and
reacting the pre-polyester and optionally other reactants, under polycondensation reaction conditions, to form the polyester oligomer, the polyester or both.

111. The process of claim 110 wherein the step of reacting under polycondensation reaction conditions is carried out in a polycondensation pipe reactor.

112. The process of claim 100 further comprising removing vapor from inside the pipe.

113. The process of claim 101 further comprising removing vapor from inside the pipe.

114. The process of claim 102 further comprising removing vapor from inside the pipe.

115. The process of claim 103 further comprising removing vapor from inside the pipe.

116. A process for making a polyester oligomer, a polyester or both comprising:
performing the process according to claim 112 to make a pre-polyester; and
reacting the pre-polyester and optionally other reactants, under polycondensation reaction conditions, to form the polyester oligomer, the polyester or both.

117. A process for making a polyester oligomer, a polyester or both comprising:
performing the process according to claim 115 to make a pre-polyester; and
reacting the pre-polyester and optionally other reactants, under polycondensation reaction conditions, to form the polyester oligomer, the polyester or both.

118. The process of claim 100 further comprising removing vapor from the pipe at a least one bend and wherein the pipe is serpentine and has at least one weir at an effective distance from a bend.

119. The process of claim 101 further comprising removing vapor from the pipe at a least one bend and wherein the pipe is serpentine and has at least one weir at an effective distance from a bend.

120. The process of claim 102 further comprising removing vapor from the pipe at a least one bend and wherein the pipe is serpentine and has at least one weir at an effective distance from a bend.

121. The process of claim 103 further comprising removing vapor from the pipe at a least one bend and wherein the pipe is serpentine and has at least one weir at an effective distance from a bend.

122. The process of claim 100 further comprising adding a solubilizing agent into the pipe.

123. The process of claim 101 further comprising adding a solubilizing agent into the pipe.

124. The process of claim 102 further comprising adding a solubilizing agent into the pipe.

125. The process of claim 103 further comprising adding a solubilizing agent into the pipe.

126. A process for making a polyester oligomer, a polyester or both comprising:
performing the process according to claim 122 to make a pre-polyester; and
reacting the pre-polyester and optionally other reactants, under polycondensation reaction conditions, to form the polyester oligomer, the polyester or both.

127. A process for making a polyester oligomer, a polyester or both comprising:
performing the process according to claim 125 to make a pre-polyester; and
reacting the pre-polyester and optionally other reactants, under polycondensation reaction conditions, to form the polyester oligomer, the polyester or both.

128. The process of claim 122 wherein the solubilizing agent comprises a polyester oligomer.

129. The process of claim 123 wherein the solubilizing agent comprises a polyester oligomer.

130. The process of claim 124 wherein the solubilizing agent comprises a polyester oligomer.

131. The process of claim 125 wherein the solubilizing agent comprises a polyester oligomer.

132. A process for making a polyester oligomer, a polyester or both comprising:
performing the process according to claim 128 to make a pre-polyester; and
reacting the pre-polyester and optionally other reactants, under polycondensation reaction conditions, to form the polyester oligomer, the polyester or both.

133. A process for making a polyester oligomer, a polyester or both comprising:
performing the process according to claim 131 to make a pre-polyester; and
reacting the pre-polyester and optionally other reactants, under polycondensation reaction conditions, to form the polyester oligomer, the polyester or both.

134. The process of claim 100 wherein the reactants forming the pre-polyester comprise a diacid, a diol, a diester, a hydroxy ester, an acid ester, a hydroxy acid or combinations thereof.

135. The process of claim 101 wherein the reactants forming the pre-polyester comprise a diacid, a diol, a diester, a hydroxy ester, an acid ester, a hydroxy acid or combinations thereof.

136. The process of claim 102 wherein the reactants forming the pre-polyester comprise a diacid, a diol, a diester, a hydroxy ester, an acid ester, a hydroxy acid or combinations thereof.

137. The process of claim 103 wherein the reactants forming the pre-polyester comprise a diacid, a diol, a diester, a hydroxy ester, an acid ester, a hydroxy acid or combinations thereof.

138. A process for making a polyester oligomer, a polyester or both comprising:

performing the process according to claim 134 to make a pre-polyester; and reacting the pre-polyester and optionally other reactants, under polycondensation reaction conditions, to form the polyester oligomer, the polyester or both.

139. A process for making a polyester oligomer, a polyester or both comprising:

performing the process according to claim 137 to make a pre-polyester; and reacting the pre-polyester and optionally other reactants, under polycondensation reaction conditions, to form the polyester oligomer, the polyester or both.

140. The process of claim 100 wherein the reactants forming the pre-polyester comprise TPA, DMT, CHDM, IPA, EG or combinations thereof.

141. The process of claim 101 wherein the reactants forming the pre-polyester comprise TPA, DMT, CHDM, IPA, EG or combinations thereof.

142. The process of claim 102 wherein the reactants forming the pre-polyester comprise TPA, DMT, CHDM, IPA, EG or combinations thereof.

143. The process of claim 103 wherein the reactants forming the pre-polyester comprise TPA, DMT, CHDM, IPA, EG or combinations thereof.

144. A process for making a polyester oligomer, a polyester or both comprising:

performing the process according to claim 140 to make a pre-polyester; and reacting the pre-polyester and optionally other reactants, under polycondensation reaction conditions, to form the polyester oligomer, the polyester or both.

145. A process for making a polyester oligomer, a polyester or both comprising:

performing the process according to claim 143 to make a pre-polyester; and reacting the pre-polyester and optionally other reactants, under polycondensation reaction conditions, to form the polyester oligomer, the polyester or both.

146. The process of claim 100 further comprising adding a solubilizing agent comprising a polyester oligomer into the pipe and wherein the reactants forming the pre-polyester comprise TPA, DMT, CHDM, IPA, EG or combinations thereof.

147. The process of claim 101 further comprising adding a solubilizing agent comprising a polyester oligomer into the pipe and wherein the reactants forming the pre-polyester comprise TPA, DMT, CHDM, IPA, EG or combinations thereof.

148. The process of claim 102 further comprising adding a solubilizing agent comprising a polyester oligomer into the pipe and wherein the reactants forming the pre-polyester comprise TPA, DMT, CHDM, IPA, EG or combinations thereof.

149. The process of claim 103 further comprising adding a solubilizing agent comprising a polyester oligomer into the pipe and wherein the reactants forming the pre-polyester comprise TPA, DMT, CHDM, IPA, EG or combinations thereof.

150. The process of claim 112 further comprising adding a solubilizing agent comprising a polyester oligomer into the pipe and wherein the reactants forming the pre-polyester comprise TPA, DMT, CHDM, IPA, EG or combinations thereof.

151. The process of claim 113 further comprising adding a solubilizing agent comprising a polyester oligomer into the pipe and wherein the reactants forming the pre-polyester comprise TPA, DMT, CHDM, IPA, EG or combinations thereof.

152. The process of claim 114 further comprising adding a solubilizing agent comprising a polyester oligomer into the pipe and wherein the reactants forming the pre-polyester comprise TPA, DMT, CHDM, IPA, EG or combinations thereof.

153. The process of claim 115 further comprising adding a solubilizing agent comprising a polyester oligomer into the pipe and wherein the reactants forming the pre-polyester comprise TPA, DMT, CHDM, IPA, EG or combinations thereof.

154. A process for making a polyester oligomer, a polyester or both comprising:

performing the process according to claim 146 to make a pre-polyester; and reacting the pre-polyester and optionally other reactants, under polycondensation reaction conditions, to form the polyester oligomer, the polyester or both.

155. A process for making a polyester oligomer, a polyester or both comprising:

performing the process according to claim 149 to make a pre-polyester; and reacting the pre-polyester and optionally other reactants, under polycondensation reaction conditions, to form the polyester oligomer, the polyester or both.

156. A process for making a polyester oligomer, a polyester or both comprising:

performing the process according to claim 150 to make a pre-polyester; and reacting the pre-polyester and optionally other reactants, under polycondensation reaction conditions, to form the polyester oligomer, the polyester or both.

157. A process for making a polyester oligomer, a polyester or both comprising:

performing the process according to claim 153 to make a pre-polyester; and reacting the pre-polyester and optionally other reactants, under polycondensation reaction conditions, to form the polyester oligomer, the polyester or both.

158. The process of claim 104 wherein the polyester is PET or PETG.

159. The process of claim 105 wherein the polyester is PET or PETG.

160. The process of claim 106 wherein the polyester is PET or PETG.

161. The process of claim 107 wherein the polyester is PET or PETG.

162. The process of claim 108 wherein the polyester is PET or PETG.

163. The process of claim 109 wherein the polyester is PET or PETG.

164. The process of claim 110 wherein the polyester is PET or PETG.

165. The process of claim 111 wherein the polyester is PET or PETG.

166. The process of claim 100 wherein stratified flow appears in the pipe.

167. The process of claim 101 wherein stratified flow appears in the pipe.

168. The process of claim 102 wherein stratified flow appears in the pipe.

169. The process of claim 103 wherein stratified flow appears in the pipe.

170. A process for making a polyester oligomer, a polyester or both comprising:

performing the process according to claim 166 to make a pre-polyester; and reacting the pre-polyester and optionally other reactants, under polycondensation reaction conditions, to form the polyester oligomer, the polyester or both.

171. A process for making a polyester oligomer, a polyester or both comprising:

performing the process according to claim 167 to make a pre-polyester; and reacting the pre-polyester and optionally other reactants, under polycondensation reaction conditions, to form the polyester oligomer, the polyester or both.

172. A process for making a polyester oligomer, a polyester or both comprising:

performing the process according to claim 168 to make a pre-polyester; and reacting the pre-polyester and optionally other reactants, under polycondensation reaction conditions, to form the polyester oligomer, the polyester or both.

173. A process for making a polyester oligomer, a polyester or both comprising:

performing the process according to claim 169 to make a pre-polyester; and reacting the pre-polyester and optionally other reactants, under polycondensation reaction conditions, to form the polyester oligomer, the polyester or both.

174. The process of claim 100 wherein the liquid superficial velocity is between 0.01 and 0.15 m/s and the vapor superficial velocity is between 0.6 and 3.0 m/s across any full cross sectional area inside the pipe perpendicular to the flow path in the pipe.

175. The process of claim 101 wherein the liquid superficial velocity is between 0.01 and 0.15 m/s and the vapor superficial velocity is between 0.6 and 3.0 m/s across any full cross sectional area inside the pipe perpendicular to the flow path in the pipe.

176. The process of claim 102 wherein the liquid superficial velocity is between 0.01 and 0.15 m/s and the vapor superficial velocity is between 0.6 and 3.0 m/s across any full cross sectional area inside the pipe perpendicular to the flow path in the pipe.

177. The process of claim 103 wherein the liquid superficial velocity is between 0.01 and 0.15 m/s and the vapor superficial velocity is between 0.6 and 3.0 m/s across any full cross sectional area inside the pipe perpendicular to the flow path in the pipe.

178. A process for making a polyester oligomer, a polyester or both comprising:

performing the process according to claim 174 to make a pre-polyester; and reacting the pre-polyester and optionally other reactants, under polycondensation reaction conditions, to form the polyester oligomer, the polyester or both.

179. A process for making a polyester oligomer, a polyester or both comprising:

performing the process according to claim 175 to make a pre-polyester; and reacting the pre-polyester and optionally other reactants, under polycondensation reaction conditions, to form the polyester oligomer, the polyester or both.

180. A process for making a polyester oligomer, a polyester or both comprising:

performing the process according to claim 176 to make a pre-polyester; and reacting the pre-polyester and optionally other reactants, under polycondensation reaction conditions, to form the polyester oligomer, the polyester or both.

181. A process for making a polyester oligomer, a polyester or both comprising:

performing the process according to claim 177 to make a pre-polyester; and reacting the pre-polyester and optionally other reactants, under polycondensation reaction conditions, to form the polyester oligomer, the polyester or both.

182. The process of claim 100 wherein flow through the pipe reactor is defined by Baker plot parameters $B_x$ and $B_y$, and wherein $B_x$ is less than 4.0 while $B_y$ is less than 2.0 or $B_x$ is greater than or equal to 4.0 while $(\log_{10} B_y)$ is less than or equal to $-0.677(\log_{10} B_x)+0.700$ on average across any full cross sectional area inside the pipe perpendicular to the flow path in the pipe.

183. The process of claim 101 wherein flow through the pipe reactor is defined by Baker plot parameters $B_x$ and $B_y$, and wherein $B_x$ is less than 4.0 while $B_y$ is less than 2.0 or $B_x$ is greater than or equal to 4.0 while $(\log_{10} B_y)$ is less than or equal to $-0.677(\log_{10} B_x)+0.700$ on average across any full cross sectional area inside the pipe perpendicular to the flow path in the pipe.

184. The process of claim 102 wherein flow through the pipe reactor is defined by Baker plot parameters $B_x$ and $B_y$, and wherein $B_x$ is less than 4.0 while $B_y$ is less than 2.0 or $B_x$ is greater than or equal to 4.0 while $(\log_{10} B_y)$ is less than or equal to $-0.677(\log_{10} B_x)+0.700$ on average across any full cross sectional area inside the pipe perpendicular to the flow path in the pipe.

185. The process of claim 103 wherein flow through the pipe reactor is defined by Baker plot parameters $B_x$ and $B_y$, and wherein $B_x$ is less than 4.0 while $B_y$ is less than 2.0 or $B_x$ is greater than or equal to 4.0 while $(\log_{10} B_y)$ is less than or equal to $-0.677(\log_{10} B_x)+0.700$ on average across any full cross sectional area inside the pipe perpendicular to the flow path in the pipe.

186. A process for making a polyester oligomer, a polyester or both comprising:

performing the process according to claim 182 to make a pre-polyester; and reacting the pre-polyester and optionally other reactants, under polycondensation reaction conditions, to form the polyester oligomer, the polyester or both.

187. A process for making a polyester oligomer, a polyester or both comprising:

performing the process according to claim 183 to make a pre-polyester; and reacting the pre-polyester and optionally other reactants, under polycondensation reaction conditions, to form the polyester oligomer, the polyester or both.

188. A process for making a polyester oligomer, a polyester or both comprising:

performing the process according to claim 184 to make a pre-polyester; and reacting the pre-polyester and optionally other reactants, under polycondensation reaction conditions, to form the polyester oligomer, the polyester or both.

189. A process for making a polyester oligomer, a polyester or both comprising:

performing the process according to claim 185 to make a pre-polyester; and reacting the pre-polyester and optionally other reactants, under polycondensation reaction conditions, to form the polyester oligomer, the polyester or both.

190. The process of claim 146 wherein stratified flow appears in the pipe.

191. The process of claim 149 wherein stratified flow appears in the pipe.

192. A process for making a polyester oligomer, a polyester or both comprising:
performing the process according to claim 191 to make a pre-polyester; and
reacting the pre-polyester and optionally other reactants, under polycondensation reaction conditions, to form the polyester oligomer, the polyester or both.

193. The process of claim 143 wherein the pipe has a generally serpentine shape and stratified flow appears in the pipe.

194. The process of claim 149 wherein the pipe has a generally serpentine shape and stratified flow appears in the pipe.

195. The process of claim 145 wherein the pipe has a generally serpentine shape and stratified flow appears in the pipe.

196. The process of claim 195 wherein the step of reacting under polycondensation reaction conditions is carried out in a polycondensation pipe reactor.

197. The process of claim 157 wherein the pipe is serpentine and stratified flow appears in the pipe, the step of reacting under polycondensation reaction conditions is carried out in a polycondensation pipe reactor and the polyester is PET.

198. An apparatus for making a pre-polyester comprising:
an esterification pipe reactor comprising a pipe, the pipe having an inlet and an outlet, the pipe including at least one substantially horizontal section and the pipe being constructed such that flow inside the pipe from the inlet to the outlet follows a path that is not totally vertical nor totally horizontal, wherein pre-polyester forming reactants are passed towards the outlet, and wherein said reactants flow in two-phase liquid/vapor flow in at least a portion of the substantially horizontal section of the pipe.

199. The apparatus of claim 198 wherein the pipe is constructed such that flow inside the pipe from the inlet to the outlet follows an overall upward, but not totally vertical path.

200. The apparatus of claim 199 wherein the pipe is substantially devoid of rigid internal structures.

201. The apparatus of claim 199 wherein the pipe is constructed such that flow inside the pipe from the inlet to the outlet follows an overall upward, but not totally vertical path, with this path being also generally non-downward, non-vertical.

202. The apparatus of claim 201 wherein the pipe is substantially devoid of rigid internal structures.

203. An apparatus for making a polyester oligomer, a polyester or both comprising:
the apparatus of claim 199 and
a polycondensation reactor connected to the outlet of the pipe.

204. The apparatus of claim 203 wherein the polycondensation reactor is a polycondensation pipe reactor.

205. An apparatus for making a polyester oligomer, a polyester or both comprising:
the apparatus of claim 200 and
a polycondensation reactor connected to the outlet of the pipe.

206. The apparatus of claim 205 wherein the polycondensation reactor is a polycondensation pipe reactor.

207. An apparatus for making a polyester oligomer, a polyester or both comprising:
the apparatus of claim 201 and
a polycondensation reactor connected to the outlet of the pipe.

208. The apparatus of claim 207 wherein the polycondensation reactor is a polycondensation pipe reactor.

209. An apparatus for making a polyester oligomer, a polyester or both comprising:
the apparatus of claim 202 and
a polycondensation reactor connected to the outlet of the pipe.

210. The apparatus of claim 209 wherein the polycondensation reactor is a polycondensation pipe reactor.

211. The apparatus of claim 201 further comprising means for removing vapor from inside the pipe at least one point along the pipe.

212. The apparatus of claim 202 further comprising means for removing vapor from inside the pipe at least one point along the pipe.

213. The apparatus of claim 199 wherein the pipe has a generally serpentine shape.

214. The apparatus of claim 200 wherein the pipe has a generally serpentine shape.

215. The apparatus of claim 201 wherein the pipe has a generally serpentine shape.

216. The apparatus of claim 202 wherein the pipe has a generally serpentine shape.

217. The apparatus of claim 201 further comprising a tank for holding solubilizing agent connected to the pipe at a point other than the outlet.

218. The apparatus of claim 201 further comprising a recycle line connecting the pipe at a point nearer to the outlet than the inlet with the pipe at a point nearer the inlet than the outlet.

219. The apparatus of claim 207 further comprising a flow line from the polycondensation reactor to the pipe at a point other than the outlet.

220. The apparatus of claim 198 wherein the pipe is constructed such that flow inside the pipe from the inlet to the outlet follows an overall downward, but not totally vertical path.

221. The apparatus of claim 220 wherein the pipe is substantially devoid of rigid internal structures.

222. The apparatus of claim 220 wherein the pipe is constructed such that flow inside the pipe from the inlet to the outlet follows an overall downward, but not totally vertical path, with this path being also generally non-upward, non-vertical.

223. The apparatus of claim 222 wherein the pipe is substantially devoid of rigid internal structures.

224. An apparatus for making a polyester oligomer, a polyester or both comprising:
the apparatus of claim 220 and
a polycondensation reactor connected to the outlet of the pipe.

225. The apparatus of claim 224 wherein the polycondensation reactor is a polycondensation pipe reactor.

226. An apparatus for making a polyester oligomer, a polyester or both comprising:
the apparatus of claim 221 and
a polycondensation reactor connected to the outlet of the pipe.

227. The apparatus of claim 226 wherein the polycondensation reactor is a polycondensation pipe reactor.

228. An apparatus for making a polyester oligomer, a polyester or both comprising:
the apparatus of claim 222 and
a polycondensation reactor connected to the outlet of the pipe.

229. The apparatus of claim 228 wherein the polycondensation reactor is a polycondensation pipe reactor.

230. An apparatus for making a polyester oligomer, a polyester or both comprising:
the apparatus of claim 223 and
a polycondensation reactor connected to the outlet of the pipe.

231. The apparatus of claim 230 wherein the polycondensation reactor is a polycondensation pipe reactor.

232. The apparatus of claim 222 further comprising means for removing vapor from inside the pipe at least one point along the pipe.

233. The apparatus of claim 223 further comprising means for removing vapor from inside the pipe at least one point along the pipe.

234. The apparatus of claim 220 further comprising means for removing vapor from the pipe at a least one bend and wherein the pipe has a generally serpentine shape and has at least one weir at an effective distance from a bend.

235. The apparatus of claim 221 further comprising removing vapor from the pipe at a least one bend and wherein the pipe has a generally serpentine shape and has at least one weir at an effective distance from a bend.

236. The apparatus of claim 222 further comprising removing vapor from the pipe at a least one bend and wherein the pipe has a generally serpentine shape and has at least one weir at an effective distance from a bend.

237. The apparatus of claim 223 further comprising removing vapor from the pipe at a least one bend and wherein the pipe has a generally serpentine shape and has at least one weir at an effective distance from a bend.

238. The apparatus of claim 222 further comprising a tank for holding solubilizing agent connected to the pipe at a point other than the outlet.

239. The apparatus of claim 222 further comprising a recycle line connecting the pipe at a point nearer to the outlet than the inlet with the pipe at a point nearer the inlet than the outlet.

240. The apparatus of claim 228 further comprising a flow line from the polycondensation reactor to the pipe at a point other than the outlet.

241. A process comprising:
esterifying one or more reactants flowing through a pipe reactor, wherein said pipe reactor includes at least one substantially straight pipe section and at least one curved pipe section, wherein said reactants flow through at least a portion of the straight pipe section in two-phase liquid/vapor flow.

242. The process of claim 241, wherein said two-phase flow is stratified flow.

243. The process of claim 241, wherein said pipe reactor has substantially the same diameter along its length.

244. The process of claim 241, wherein said straight pipe section is substantially horizontally oriented.

245. The process of claim 241, wherein said reactants flow in a not totally vertical, not totally horizontal, generally upward fashion through at least a portion of the curved pipe section.

246. The process of claim 241, wherein said curved pipe section includes at least one generally U-shaped bend.

247. The process of claim 241, wherein said pipe reactor has a generally serpentine shape.

248. The process of claim 241, wherein said pipe reactor is substantially devoid of rigid internal structures.

249. The process of claim 241, wherein said reactants comprise TPA, DMT, CHDM, IPA, EG or combinations thereof.

250. A process for making a polyester comprising:
passing one or more reactants through a reactor from an inlet to an outlet of the reactor, wherein the inlet and outlet of the reactor are vertically spaced from one another, wherein the reactants flow back and forth through the reactor from the inlet to the outlet, wherein the reactor includes at least one substantially straight and/or substantially horizontal first pipe section, wherein the reactants flow through at least a portion of the straight and/or horizontal first pipe section in two-phase liquid/vapor flow; and
subjecting at least one of the reactants to chemical reaction as the reactants flow through the reactor.

251. The process of claim 250, wherein said first pipe section is substantially horizontal.

252. The process of claim 251, wherein said first pipe section is substantially straight.

253. The process of claim 250, wherein said two-phase flow is stratified flow.

254. The process of claim 250, wherein said reactor further comprises a second pipe section that is substantially straight and/or substantially horizontal, wherein the first and second pipe sections are vertically spaced from one another.

255. The process of claim 254, wherein said reactants flow through at least a portion of the second pipe section in two-phase vapor/liquid flow.

256. The process of claim 255, wherein said two-phase vapor/liquid flow in the first and second pipe sections is stratified flow.

257. The process of claim 254, wherein said first and second pipe sections are substantially horizontal.

258. The process of claim 257, wherein said first and second pipe sections are substantially straight.

259. The process of claim 250, wherein said reactor has a generally serpentine shape.

260. The process of claim 250, wherein said reactants comprise TPA, DMT, CHDM, IPA, EG or combinations thereof.

* * * * *